Nov. 17, 1964 R. J. WOJCIKOWSKI 3,157,133
TIE-DOWN

Filed Sept. 9, 1963 2 Sheets-Sheet 1

Nov. 17, 1964    R. J. WOJCIKOWSKI    3,157,133
TIE-DOWN

Filed Sept. 9, 1963    2 Sheets-Sheet 2

United States Patent Office 3,157,133
Patented Nov. 17, 1964

3,157,133
TIE-DOWN
Richard J. Wojcikowski, Toledo, Ohio, assignor to Dana Corporation, Toledo, Ohio, a corporation of Virginia
Filed Sept. 9, 1963, Ser. No. 307,417
14 Claims. (Cl. 105—368)

This invention relates to tie-downs for use in securing items of lading to a transporting structure and more particularly to tie-downs for use in conjunction with co-operating tracks carried by the transporting structure wherein the tie-downs are movable within the tracks to a desired position relative thereto and including means for securing the tie-down relative to the tracks.

In securing items of lading to a transporting structure, for example, an automotive vehicle on a railway car, it is essential that great flexibility be present in the ability to position the tie-downs so that various sizes and types of lading can be successfully secured. Such positioning must be easily performed by an operator so that the loading and unloading can proceed rapidly and inexpensively.

Many positionably adjustable tie-downs are known in the art; however, these are deficient in several aspects. The usual tie-down is in the form of a winch which comprises a body portion slidable in a track, means for securing the body portion in a fixed position relative to the track, a chain or the like one end of which is secured to the item of lading and the other end of which is attached to a drum rotatably carried by the winch body; the drum being operative to adjust the tension of the chain to suitably secure the item of lading to the transporting structure. Since the adjustable feature of the tie-down is basically controlled by the locking device, the drum providing final adjustment, it is of prime importance that when the locking device is engaged it successfully maintains the adjusted position of the tie-down and when disengaged it in no way interferes with the adjustment of the position.

The most desirable manner, from the operator's standpoint, for moving the unlocked tie-down to a new position is to grasp the free end of the chain, which at this time is not secured to the item of lading, and by utilizing the chain, pull the winch along the track. Accordingly, with tie-downs as shown in United States Patent No. 3,092,368, such upward and longitudinal pulling on the chain may automatically cause engagement of the locking device and inhibit free adjustment of the winch.

Another problem encountered by the operators is that when foreign matter, as for example ice in winter, becomes deposited in the track, it often becomes necessary to strike the tie-down and forcefully urge the same relative to the track when positioning it. In such cases, it is of utmost importance that the locking device does not automatically engage itself and also that the locking device is in a position where it will not receive the force of the blow and be inadvertently deformed or engaged. While avoiding the above deficiencies, it is of prime importance that the locking device securely locks the winch to the track and maintains this locking relationship during the transportation of the item of lading regardless of the type or severity of impact loads, vibrations, etc. imposed thereon. The tie-down which is shown in United States Patent No. 2,969,023 includes a locking member which when disengaged in no way interferes with adjusting the position of the tie-down; however, this locking member is disposed in a position where it would be easily inadvertently struck by a blow in attempting to move the tie-down when adjusting the same. The tie-down shown in United States Patent No. 3,038,740, solves the above mentioned problems, but results in a new problem in that the locking device is a portion of the drum so that when the locking portion of the drum is fully engaged, it will bind and interfere with adjusting of the drum and tensioning of the chain secured thereto.

It is, therefore, an object of this invention to provide a tie-down device for securing items of lading to a transport structure which is adapted to be slidably mounted in a track carried by the structure and includes improved means for positionably locking the tie-down device to the track.

It is another object of this invention to provide such a device wherein the locking means in its unlocked position will not interfere with adjusting the sliding position of the tie-down relative to the track.

Yet another object of this invention is to provide such a tie-down including a locking member which, when in its unlocked position, will not be subjected to inadvertent blows when the tie-down is struck to change the position thereof.

Yet a further object of this invention is to provide such a tie-down including a locking member, which member in its locked position does not interfere with the final tensioning adjustment by the tie-down drum.

It is a further object of this invention to provide such a tie-down which is durable, easily adjusted and locked relative to the track, yet is inexpensive and easily produced.

Further and other objects of this invention will become apparent upon a consideration of the specification in view of the drawings wherein.

Figure 1:
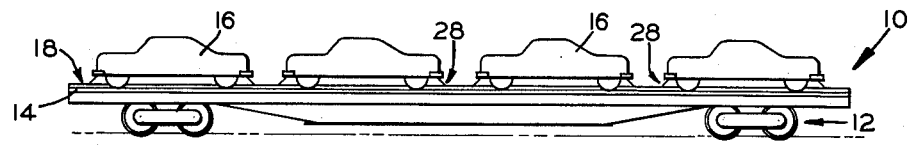
FIG. 1 is a side elevational view of a transporting structure in the form of a railway flat car having items of lading in the form of motor vehicles loaded thereon.
Figure 2:
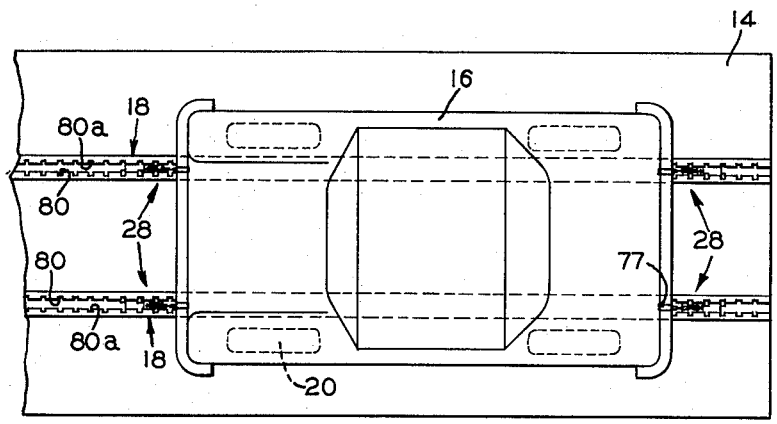
FIG. 2 is a plan view of the structure shown in FIG. 1 with some of the motor vehicles omitted to show the position of the track mounted on the deck of the flat car.
Figure 3:
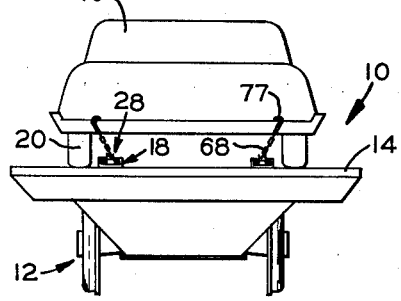
FIG. 3 is an end elevational view of the structure shown in FIG. 1.

In a preferred embodiment of this invention, an elongated track is suitably secured to the vehicle supporting surface of a railway car. The track is of channel configuration having a generally C-shaped cross section and having a pair of laterally spaced opposed flanges each terminating at its upper end in an inwardly extending lip. Slidably disposed between the flanges of the channel is the tie-down including a winch body having a pair of laterally spaced side walls with at least a portion of each side wall disposed beneath the underside of the lip adjacent the same.

The lip on at least one flange of the channel is provided with a plurality of longitudinally spaced detents, while the side wall of the winch body adjacent this lip is provided with a pair of openings longitudinally spaced so as to be alignable with selected detents in the lip. The tie-down also includes means for locking the same to the track which takes the form of an E-shaped member having a longitudinally extending shaft portion and three longitudinally spaced second portions or projections extending normally therefrom; the second portions being spaced along the shaft portion at intervals corresponding to the spacing of the detents in the lip. The shaft portion is disposed within the channel and outside of the winch body side wall and below the lip and is adapted to rotate about its longitudinal axis. One of the projections is disposed longitudinally beyond the winch body, while the other two projections are aligned with the openings in the side wall of the winch body.

By grasping said one projection, the operator can rotate the shaft portion toward the winch body so that the other two projections are positioned in the openings in the winch body side wall and do not engage the track. In this position the tie-down is completely unlocked and can easily be slid longitudinally relative to the track into the selected position with the openings in the side wall thereof aligned with the desired detents. The shaft portion is then rotated toward the wall of the channel until said other two projections engages both the side wall within the openings and the detents aligned therewith, thereby securely locking the winch relative to the track. Means are also carried by the winch to maintain the shaft portion in the locked position. One end of a chain is then securely attached to the item of lading while the other end thereof, which is secured on a drum carried by the winch, is wound on the drum thereby adjusting the tension of the chain on the item of lading. Upon tensioning of the chain, the tie-down is lifted upwardly so that the portion of the walls of the tie-down beneath the lips of the track are restrained from moving upwardly by the lip while engagement of the projections with the track and side walls prevents the tie-down from moving longitudinally relative to the track. The locking means for the tie-down serves as the coarse adjustment of the tie-down while the drum carried by the tie-down serves as the fine adjustment.

Referring to the drawings, a railway car 10, provided with the usual track engaging wheels 12, has a horizontally disposed longitudinally elongated and laterally extending vehicle supporting surface or deck 14; the latter being adapted to support a plurality of aligned vehicles 16. A pair of longitudinally elongated tie-down tracks 18 are suitably secured to the top of the deck 14 and preferably laterally spaced so as to lie between the wheels 20 of the vehicles 16 to be carried thereon.

The tracks 18 are each of channel configuration, being substantially C-shaped in cross section, and include a flat bottom portion 22 resting on the deck 14, laterally spaced and parallel flanges 24 formed integrally with the base and extending vertically therefrom and a lip 26 carried by one flange and a lip 27 carried by the other flange, which lips extend inwardly toward each other. Slidably carried by the track 18 is a plurality of tie-down devices 28, one tie-down for each corner of each vehicle 16, which tie-downs each include a body portion constructed of a pair of laterally spaced side walls 30 and 32, the side wall 30 being disposed adjacent the lip 26 and the side wall 32 adjacent the lip 27, while the bottom of the walls slidably engage the bottom portion 22 of the track 18. The side walls 30 and 32 are each substantially J-shape in configuration with their respective curved lower portions 34 and 36 facing outwardly and extending under the lips 26 and 27 respectively; the portion 34 of the wall 30 under the lip 26 being operative to engage the lip 26 upon upward movement of the tie-down 28 relative to the track 18. A pair of spacer struts 40 and 42 securely interconnect the walls 30 and 32 with, as viewed in FIG. 6, the strut 40 being positioned between the lower left end of the walls while the strut 42 is positioned between the upper right end of the walls.

A drum 44 is rotatably carried by the walls 30 and 32. More particularly, the drum 44 has opposed axially extending trunnions 46 and 48 which are respectively rotatably mounted in aligned openings 50 and 52 formed in the side walls 30 and 32 respectively. The trunnion 46 is provided with a tool engaging means in the end thereof in the form of a square depression 54 which is adapted to receive the registering portion of a tool (not shown) by which the drum may be rotated. A ratchet wheel 56 is formed integrally with the drum 44 and is engageable by a pawl 58 which is suitably secured for unitary rotation to a cross shaft 60, which shaft is rotatably mounted in aligned openings 62 formed in the walls 30 and 32. A leaf spring 64 is secured at one of its ends to the strut 40 by a rivet 65 and pressingly engages a flat surface 66 formed on the pawl 58 when the latter is in the position shown as FIG. 6. In this position, the pawl 58 prevents the ratchet 56 and drum 44 from moving counterclockwise, while the ratchet and drum may move clockwise by camming the pawl 58 counterclockwise against the bias of the spring 64. The pawl 58 includes a lever portion 59 which may be manually operated to rotate the pawl counterclockwise away from engagement with the ratchet and to a position where the spring 64 no longer engages the flat surface 66 but engages a curved surface 67 on the pawl adjacent the flat surface and does not urge the pawl to engage the ratchet.

A tie-down chain 68 has a portion of one link 70 received in a slot 72 formed in the drum 44, and a locking pin 74 is pressed through an opening 76 in the drum and through the opening in the link 70 to securedly lock the latter to the drum. The other end of the chain 68 is provided with a hook 77 which is secured to an appropriate portion of one of the vehicles 16. Upon clockwise rotation of the drum 44, the chain is wound thereon and tensioned to secure the vehicle, while upon counterclockwise rotation of the drum, the chain is unwound and the tension thereon released.

Means is provided to maintain the tie-down 28 longitudinally stationary relative to the track 18 and the vehicle 16 so that the chain 68 may be tensioned to secure the vehicle to the railway car, for as the chain is tensioned it urges the tie-down to move vertically upwardly and also longitudinally. More particularly, the lip 27 of the track 18 is provided with a plurality of first engaging means in the form of equally and longitudinally spaced detents 80, which detents are open at the inner edge of the lip. The side wall 32 of the tie-down 28 is provided with a pair of longitudinally spaced openings 82 so that the surface 83 of the side wall within and on the lateral portion of the openings serve as second engaging means with the space therebetween equal to or a multiple of the space between the first detents and the space between the left opening 82 and the left end of the wall 32 (as viewed in FIG. 6) being equal to or a multiple of the space between the detents so that the openings may be aligned with the desired detents; if the space between the openings is equal to the space between the detents adjacent detents will become aligned, if the space is a multiple, a constant number of detents will be skipped between the aligned detents. The tie-down 28 also includes a locking member 84 formed in the space of an E and having a longitudinally elongated shaft portion 86 and a first, second and third projection 88, 90 and 92 extending normally from the shaft portion and longitudinally spaced therealong at intervals equal to the space between the openings 82.

Figure 4:
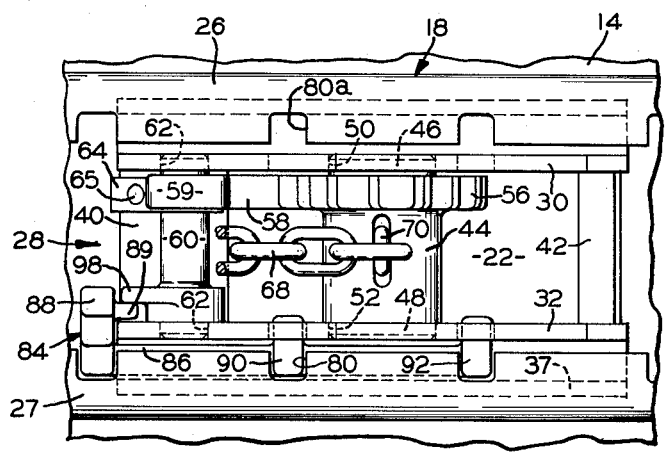
FIG. 4 is an enlarged plan view of a portion of the track and the tie-down disposed therein.
Figure 5:
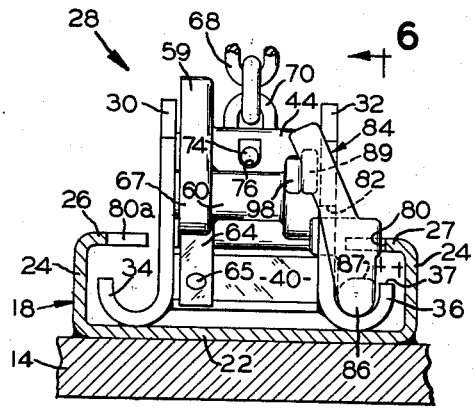
FIG. 5 is an end view of the structure shown in FIG. 4 in a locked position.
Figure 7:
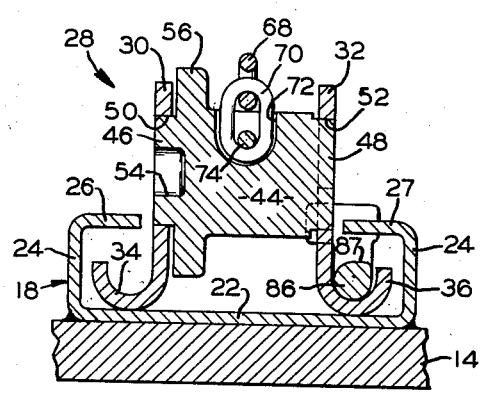
FIG. 7 is a cross sectional view of the device shown in FIG. 5 taken along the lines 7—7 in FIG. 6.
Figure 6:
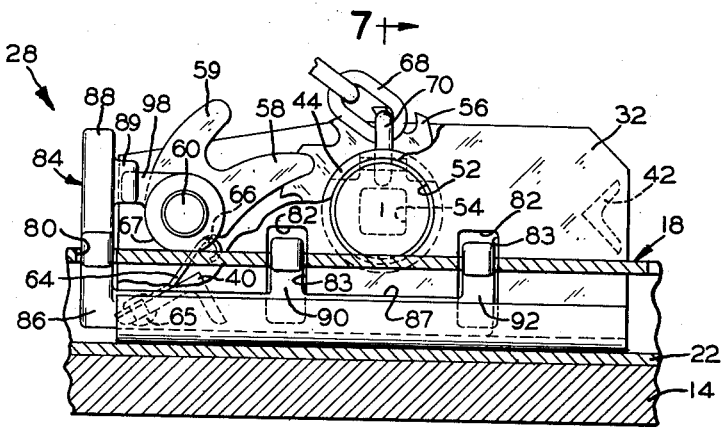
FIG. 6 is a view taken along the lines 6—6 in FIG. 5.

The shaft portion 86 is nested for rotation about its longitudinal axis between the curved lower portion 36 of the side wall 32 and the overlying portion of the lip 27 and, as viewed in FIGS. 4 and 6, extends longitudinally from its outer end which is disposed slightly beyond the left end of the side wall 32 to the openings 82 which is the farthest opening to the right. In the locked position of the locking member 84, as shown in FIGS. 4, 5 and 6 and more fully described hereinafter, the shaft 86 has a sufficiently large diameter so that a flat surface 87 formed on the top of the shaft 86 projects above the upper end 37 of the curved portion 36 of side wall 32 and is adapted to engage the lower substantially flat surface of the lip 27 upon upward movement of the tie-down 28 relative to the track 18. Since the shaft 86 engages the portion 36, and the curved portion 34 of wall 30 engages the lip 26, the track 18 restrains the tie-down from moving vertically upwardly. Additionally, with the chain 68 tensioned to hold the vehicle stationary so that the tie-down 28 is held vertically upwardly against the lips 26 and 27, the engagement between the flat surface 87 of the shaft 86 and the lip 26 will restrain the shaft 86 from rotating thereby maintaining the same in its locked position and prevent rotary vibrations of the shaft.

The first projection 88 takes the form of a manually operable lever and is positioned on the shaft 86 to the left of the side wall 32. The second and third projections 90 and 92 take the form of locking elements and are positioned on the shaft 86 so that each is aligned with one of the openings 82. The locking elements 90 and 92 are of a projecting length so that when in a first or locked position, as shown in FIGS. 4, 5 and 6, the upper ends thereof extend slightly above the lip 27 and are laterally elongated so as to be operative to simultaneously engage both the aligned detent 80 and opening 82.

Figure 8:
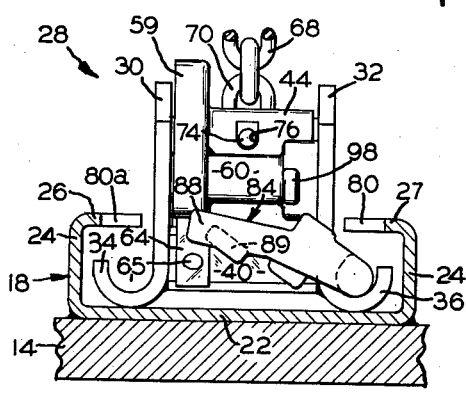
FIG. 8 is a view according to FIG. 5 with the structure in an unlocked position.

As shown in FIG. 8, the lever 88 may be rotated counterclockwise so as to rotate the shaft 86 and the locking elements 90 and 92 counterclockwise to a second or unlocked position; the openings 82 being of sufficient vertical height above the locking elements and lip 27 to accommodate the rotary movement of the locking elements, wherein the locking elements move into the openings 82 and are free from engagement with the detents 80. The lever 88 may be rotated counterclockwise until it lies at approximately a horizontal position, as shown in FIG. 8, with a boss 89, formed on the side thereof adjacent the wall 32, resting in supporting engagement on the strut 40. A space is thus provided under the lever 88 in its horizontal position so that it is easily grasped by hand and will pass over minor foreign matter, such as ice and snow, carried by the bottom 22 of the track 18. In this position, the tie-down 28 may be freely moved without inadvertent or automatic energization of the locking member 84, since the locking elements are disposed substantially within the wall 32, and any blows upon the tie-down 28 to urge the same along the track should not be inadvertently delivered upon the locking member since it is far below the upper portion of the tie-down 28.

After moving the tie-down 28 to the desired longitudinal position relative to the track 18, the lever 88 is rotated clockwise into the detent 80 aligned therewith, thereby rotating the shaft 86 and locking elements 90 and 92 clockwise to the locked position wherein the locking elements engage the surface 83 of the side wall 32 within the openings 82 and the detents 80 aligned therewith and lock the tie-down in a stationary position relative to the track 18. To insure that the lever 88 is not inadvertently rotated counterclockwise to an unlocked position, it is locked in its clockwise or first position by means of a latch 98 engageable with the inner side of the boss 89 on the lever 88. The latch 98 is preferably formed integrally with the cross shaft 60 for unitary rotation therewith and with the pawl 58. Accordingly, when the pawl is rotated clockwise so that it engages the ratchet wheel 56, and with the lever 88 in its locked or first position, the latch 98 is positioned so that it engages the boss 89 and maintains the locking member 84 in its locked position. At this time the drum 44 may be rotated to tighten the chain 68 but cannot rotate to release the tension therefrom; the latch 98 and boss 89 being of sufficient size so that winding of the drum which induces slight counterclockwise movement of the pawl 58 and corresponding movement of the latch does not disengage the latch from the boss.

When the lever 59 is operated to rotate the pawl 58 counterclockwise to its unlocked position where it is slightly removed from and no longer engages the ratchet 56, the cross shaft 60, which rotates unitarily with the pawl, carries the latch 98 counterclockwise to a position where it still engages the lower portion of the boss 89. The drum 44 may now be rotated counterclockwise to loosen the chain 68, after which, if repositioning of the tie-down 28 is desired, the lever 59 is rotated further counterclockwise and carries the latch 98 further counterclockwise to a position below the boss 89 so that lever 88 and the balance of the locking member 84 may be moved counterclockwise to its second or unlocked position wherein the tie-down is freely longitudinally movable relative to the track 18. Accordingly, the lever 59 may assume three operative positions, a first position wherein the pawl 58 engages the ratchet wheel 56 and the latch 98 engages the boss 89, a second position wherein the pawl is slightly spaced from the ratchet wheel and the latch engages the lower portion of the boss and a third position wherein the pawl and latch are spaced from the ratchet wheel and boss respectively.

As shown in the drawings, the lip 26 is also provided with detents 80a, spaced in the same manner as detents 80, so that the tie-down 28 may be reversed end for end and the locking member 84 cooperates with the detents 80a. Further, two locking members 84 can be utilized with the tie-down 28 by providing suitable cooperating openings in the side wall 30 and positioning a locking member 84 between the wall 30 and the lip 26.

Figure 9:
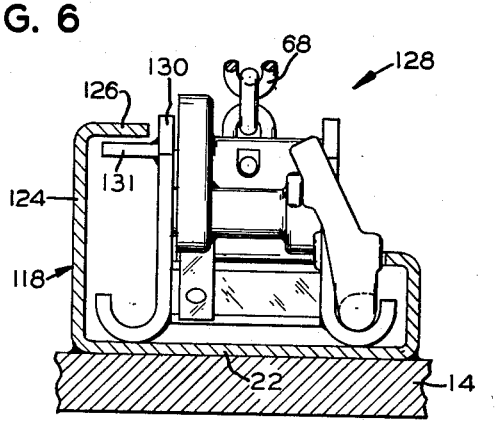
FIG. 9 is an end view of another embodiment of this invention.

A slight modification of this invention is shown in FIG. 9 wherein a left flange 124 of a track 118 extends vertically upwardly so that an inwardly extending lip 126 thereon approaches the upper portion of a side wall 130 of a tie-down 128. A bracket 131 extends for the full length of and is welded to the outer side of the wall 130 and is engageable with the lower surface of the lip 126 to inhibit upward movement of the tie-down relative to the track 118. The right flange 124 of the track 118 and the balance of the tie-down are the same as for the embodiment shown in FIGS. 1-8. The track 118 is applicable to constructions wherein, for example, it is desired to utilize this enlarged track as additional bracing support for the deck 14 of the railway car 10.

If desired, the tie-down 28 may be used as an idler mechanism either with the drum 44 as it is or by replacing the drum with a roller. In this instance, the link 70 is not secured to the drum 44, but instead the chain 68 is passed under and engages the drum 44 (or the roller substituted therefor) and the end of the chain secured to another remotely positioned tie-down 28 so that the drum tightens the chain and the tie-down 28 is lifted relative to the track 18.

It is readily apparent that many changes can be made in the various embodiments shown and described herein without departing from the underlying scope of this invention as defined by the following claims.

What is claimed is:

1. A tie-down device for use in securing an item of lading on a transporting structure comprising in combination,
   (a) track means having a longitudinally elongated axis and being adapted to be secured to the transporting structure and including a first and a second laterally spaced longitudinally elongated and vertically extending flange,
   (b) a first and a second longitudinally elongated lip carried by said first and second flanges respectively with each of said lips extending laterally from the flange carrying the same generally toward the flange carrying the other of said lips,
   (c) tie-down means longitudinally movable relative to said track means and including first and second opposed side walls having at least a portion thereof disposed between said flanges,
   (d) means fixedly interconnecting said side walls in laterally spaced-apart relationship,
   (e) at least a portion of said first and of said second side walls projecting below the underside of said first and second lips respectively whereby said lips are operative to inhibit vertical movement of said tie-down means relative to said track means, (f) a plurality of first engaging means provided with said first lip and longitudinally spaced at equal distances, (g) said first side wall having a longitudinally extending laterally outer surface and a pair of longitudinally spaced and laterally extending surfaces facing in opposed longitudinal directions and each being operative as second engaging means, (h) the space between said second engaging means being at a distance which is a multiple of the distance between said first engaging means whereby each of said second engaging means may be aligned with one of said first plurality of engaging means, (i) a locking member for securing said tie-down means against longitudinal movement relative to said track means, (j) said locking member having a longitudinally extending first portion carried by said tie-down for rotation about its longitudinal axis and a pair of locking means projecting therefrom in longitudinally spaced relationship with the distance therebetween substantially the same as the distance between said second engaging means, (k) said locking member having an unlocked position wherein one of said locking means is disposed in engagement with one of said second engaging means and the other of said locking means is disposed in engagement with the other of said second engaging means and having a locked position wherein said one locking means is disposed in engagement with said one second engaging means and the one of said first engaging means aligned therewith and said other locking means is disposed in engagement with said other engaging means and the one of said first engaging means aligned therewith, (l) said locking means in its unlocked position being inoperative to engage said second engaging means and being disposed laterally inwardly from the laterally outer surface of said side wall, (m) said first portion of said locking means being rotatable about its longitudinally extending axis to move said second locking means between said locked and unlocked positions, (n) said locking member including manually operable means for rotating the same, (o) and a flexible element adapted to be secured to the item of lading and engaged by said tie-down whereby the item of lading is secured to the transporting structure.

2. A tie-down device according to claim 1 wherein
(a) said tie-down includes a winch means rotatably mounted in said side walls,
(b) said flexible element is secured to said winch means, and
(c) said winch means is operative to tension said flexible element.

3. A tie-down device for use in securing an item of lading on a transporting structure comprising in combination, (a) track means having a longitudinally elongated axis and being adapted to be secured to the transporting structure and including a first and a second laterally spaced longitudinally elongated and vertically extending flange, (b) a first and a second longitudinally elongated lip carried by said first and second flanges respectively with each of said lips extending laterally from the flange carrying the same generally toward the flange carrying the other of said lips, (c) tie-down means longitudinally movable relative to said track means and including first and second opposed side walls having at least a portion thereof disposed between said flanges, (d) means fixedly interconnecting said side walls in laterally spaced-apart relationship, (e) at least a portion of said first and of said second side walls projecting below the underside of said first and second lips respectively whereby said lips are operative to inhibit vertical movement of said tie-down means relative to said track means, (f) a plurality of first engaging means provided with said first lip and longitudinally spaced at equal distances, (g) said first side wall having a longitudinally extending laterally outer surface and a pair of longitudinally spaced and laterally extending surfaces facing in opposed longitudinal directions and each being operative as second engaging means, (h) the space between said second engaging means being at a distance which is a multiple of the distance between said first engaging means whereby each of said second engaging means may be aligned with one of said first plurality of engaging means, (i) a locking member for securing said tie-down means against longitudinal movement relative to said track means, (j) said locking member having a longitudinally extending first portion nested between the projecting portion of said first side wall and the underside of said first lip and being rotatable about its longitudinal axis and having an outer end disposed longitudinally beyond an end of said wall and extending longitudinally inwardly relative to said side wall from said outer end to a position at least adjacent both said pair of second engaging means, (k) said first portion having a pair of locking means projecting therefrom in longitudinally spaced relationship with the distance therebetween substantially the same as the distance between said second engaging means, (l) said locking member having an unlocked position wherein one of said locking means is disposed in engagement with one of said engaging means and the other of said locking means is disposed in engagement with the other of said engaging means and both said engaging means being inoperative to engage said second engaging means and being disposed laterally inwardly from the laterally outer surface of said side wall, (m) said locking member having a locked position wherein said one locking means is disposed in engagement with said one second engaging means and the one of said first engaging means aligned therewith and said other locking means is disposed in engagement with said other engaging means and the one of said first engaging means aligned therewith, (n) said first portion of said locking means being rotatable about its longitudinally extending axis to move said locking means between said locked and unlocked positions whereby said locking member is moved to its unlocked position from its locked position upon rotation of said first portion in a first direction and is moved to its locked position from its unlocked position upon rotation of said first portion in a direction opposite to said first direction, (o) said locking member including a manually operable lever projecting from the outer end of said first portion and operative to rotate the latter in said opposite directions and having unlocked and locked positions corresponding to the unlocked and locked positions of said locking element, (p) the greater portion of said lever being disposed vertically above said first lip portion when said lever is in its locked position and the greater portion of said lever being disposed vertically below the upper surface of said first lip portion when said lever is in its unlocked position, (q) winch means carried by said side walls of said tie-down, (r) and a flexible element adapted to be secured to the item of lading and secured to said winch means whereby the latter is operative to tension the same.

4. A tie-down device for use in securing an item of lading on a transporting structure comprising in combination, (a) track means having a longitudinally elongated axis and being adapted to be secured to the transporting structure and including a first and a second laterally spaced longitudinally elongated and vertically extending flange, (b) a first and a second longitudinally elongated lip carried by said first and second flanges respectively with each of said lips extending laterally from the flange carrying the same generally toward the flange carrying the other of said lips, (c) tie-down means longitudinally movable relative to said track means and including first and second opposed side walls having at least a portion thereof disposed between said flanges, (d) means fixedly interconnecting said side walls in laterally spaced apart relationship, (e) at least a portion of said first and of said second side walls projecting below the underside of said first and second lips respectively whereby said lips are operative to inhibit vertical movement of said tie-down means relative to said track means, (f) a plurality of longitudinally spaced first engaging means provided with said first lip, (g) said first side wall having a laterally extending opening therein disposed inwardly from the longitudinal ends thereof with at least a portion of the internal surface of said first side wall defining said opening being operative as a second engaging means alignable with the desired one of said first plurality of engaging means, (h) a locking member for securing said tie-down means against longitudinal movement relative to said track means, (i) said locking member having a longitudinally extending first portion disposed between the projecting portion of said first side wall and the underside of said first lip and a second portion projecting from said first portion, (j) said locking member having a first position wherein said second portion thereof is in a locked position and engages said second engaging means and said one of said first engaging means aligned therewith whereby said tie-down means is longitudinally locked relative to said track means and a second position wherein said second portion is in an unlocked position and lies within the opening in said first side wall and is inoperative to engage the first engaging means whereby said tie-down means is free to move longitudinally relative to said track means, (k) said first portion of said locking means being rotatable about its longitudinally extending axis to move said second portion between said locked and unlocked positions, (l) said locking member including manually operable means for rotating the same, (m) means carried by said tie-down means for maintaining said locking member with the second portion thereof in its locked position, (n) and a flexible element adapted to be secured to the item of lading and engaged by said tie-down whereby the item of lading is secured to the transporting structure.

5. A tie-down device for use in securing an item of lading on a transporting structure comprising in combination, (a) track means having a longitudinally elongated axis and being adapted to be secured to the transporting structure and including a first and a second laterally spaced longitudinally elongated and vertically extending flange, (b) a first and a second longitudinally elongated lip carried by said first and second flanges respectively with each of said lips extending laterally from the flange carrying the same generally toward the flange carrying the other of said lips, (c) tie-down means longitudinally movable relative to said track means and including first and second longitudinally extending and laterally opposed side walls having at least a portion thereof disposed between said flanges, (d) means fixedly interconnecting said side walls in laterally spaced-apart relationship, (e) at least a portion of said first and of said second side walls projecting below the underside of said first and second lips respectively whereby said lips are operative to inhibit vertical movement of said tie-down means relative to said track means, (f) a plurality of longitudinally spaced first engaging means provided with said first lip, (g) said first side wall having a laterally extending opening therein disposed longitudinally inwardly from the longitudinal ends thereof with at least a portion of the internal surface of said first side wall defining said opening being operative as a second engaging means alignable with the desired one of said first plurality of engaging means upon longitudinal movement of said tie-down relative to said track means, (h) a locking member for securing said tie-down means against longitudinal movement relative to said track means, (i) said locking member having a longitudinally extending shaft portion nested between the projecting portion of said first side wall and the underside of said first lip and being rotatable about its longitudinal axis and having an outer end disposed longitudinally beyond said first side wall and extending longitudinally from said outer end to at least adjacent said second engaging means, (j) a locking element projecting from said shaft portion at a position adjacent said second engaging means and being rotatable unitarily with said shaft portion, (k) said locking element being operative to be received within the opening in said side wall and solely engage said second engaging means and to be moved to a position with a portion thereof extending from said opening and engaging the one of said first engaging means aligned therewith, (l) a manually operable lever projecting from the outer end of said shaft portion, (m) said locking member having a first position wherein said locking element is in a locked position and engages said second engaging means and said one of said first engaging means aligned therewith whereby said tie-down is longitudinally locked relative to said track means and a second position wherein said locking element is in an unlocked position and lies within the opening in said first side wall and is inoperative to engage said first engaging means whereby said tie-down means is free to move longitudinally relative to said track means, (n) said locking element being moved to its unlocked position from its locked positon upon rotation of said shaft portion in a first direction and being moved to its locked position from its unlocked position upon rotation of said shaft portion in a direction opposite to said first direction, (o) said lever being operative to rotate said shaft portions in said opposite directions and having unlocked and locked positions corresponding to said unlocked and locked positions of said locking element, (p) latch means carried by said tie-down means and engageable with said locking member for maintaining said locking element in its locked position, (q) and a flexible element adapted to be secured to the item of lading and engaged by said tie-down whereby the item of lading is secured to the transporting structure.

6. A tie-down device according to claim 5 wherein, (a) said tie-down includes a winch means rotatably mounted in said side walls, (b) said flexible element is secured to said winch means, and (c) said winch means is operative to tension said flexible element.

7. The tie-down defined in claim 5 wherein, (a) said lever in moving to its locked position rotates said shaft portion towards said first flange to move said locking element to its locked position and said lever portion is disposed substantially vertically when in its locked position, and (b) said lever in moving to its unlocked position rotates said shaft portion toward said second flange to move said locking element to its unlocked position and said lever portion is disposed substantially horizontally when in its unlocked position.

8. The tie-down defined in claim 7 wherein, (a) the greater portion of said lever is disposed vertically above said first lip portion when said lever is in its locked position and wherein the greater portion of said lever is disposed vertically below the upper surface of said first lip portion when said lever is in its locked position.

9. The tie-down defined in claim 7 wherein, (a) said first engaging means carried by said first lip are spaced at equal longitudinal first distances from each other, (b) said lever is longitudinally spaced from said locking element a distance which is a multiple of said first distance, and (c) said lever in its vertical position has a portion thereof in engagement with another of said first engaging means spaced from the one of said first engaging means engaged by said locking element.

10. The tie-down defined in claim 5 wherein, (a) said longitudinal extending shaft portion of said locking member is of a diameter such that it extends vertically upwardly a greater distance than the projecting portion of said first side wall and is operative upon vertical movement of said tie-down relative to said track means to be engagingly positioned between said first lip and said projecting portion, (b) the portion of said first lip engaged by said shaft portion is substantially flat, and (c) the surface of said shaft portion engageable with the flat portion of said first lip portion when said locking member is in its locked position is substantially flat whereby the engagement of said flat surfaces inhibit rotary movement of said locking member.

11. The tie-down device defined in claim 5 including, (a) a drum rotatably mounted in said side walls, (b) said flexible element being secured to said drum, (c) said drum being rotatable to tension said flexible element, (d) manually operable means carried by said side walls and engageable with said drum for maintaining the latter in a position tensioning said flexible element and movable to a position spaced from said drum whereby the latter is freely rotatable, and (e) means interconnecting said latching means and said manually operable means for unitary movement whereby movement of said manual operable means induces corresponding movement of said locking means, (f) said locking means being so positioned and arranged so as to lockingly engage said locking member and maintaining the same in its locked position when said manually operable means is in engagement with said drum and to be moved from locking engagement with said locking member when said manually operable means is moved to a position spaced from said drum.

12. The tie-down device defined in claim 11 wherein, (a) said manually operable means is movable to a first position engaging said drum, a second position slightly spaced from said drum and free from engagement therewith whereby the latter is freely rotatable and a third position spaced from said drum, and (b) said locking means lockingly engages said locking member when in its position corresponding to said first and second position of said manually operable means, (c) whereby said manually operable means can be moved to its second position and allow rotation of said drum while said latching means remains engaged with said locking member.

13. The tie-down device defined in claim 12 wherein, (a) said drum includes a ratchet device, (b) said manually operable means includes a spring loaded pawl engageable with said ratchet device, (c) said interconnecting means includes a cross shaft rotatably mounted in said side walls and on which said pawl is carried for unitary rotation, (d) movement of said manually operable means into engagement with said ratchet device induces rotation of said cross shaft in a first direction and movement of said manually operable means out of engagement with said ratchet device induces rotation of said cross shaft in a second direction opposite to said first direction, (e) said latch means is carried on said cross shaft for rotation therewith and latchingly engageable with said lever when the latter is in its locked position, (f) and said engagement between said locking means and lever being of sufficient extent whereby said latching means engages said lever in its positions corresponding to said first and second position of said manually operable means and is free from engagement with said lever when in a position corresponding to said third position of said manually operable means.

14. The tie-down device defined in claim 12 wherein, (a) said lever when moving to its locked position rotates outwardly toward said first lip and assumes a substantial vertical position and when moving toward its unlocked position rotates inwardly toward said second lip and assumes a substantially horizontal position, (b) said cross shaft extends laterally of said side walls and said latching means projects laterally therefrom, and (c) when said lever is in its locked substantially vertical position said latching means engages a portion thereof facing substantially inwardly and thereby prevents said lever from rotating inwardly to its unlocked position, (d) the portion of said lever engaged by said latching means and said latching means being of sufficient size whereby said latching means remains in engagement with said lever when moved to its position corresponding to said first and second position of said manually operable means.

References Cited in the file of this patent

UNITED STATES PATENTS 3,038,740   Blunden   June 12, 1962
3,120,375   Haynes   Feb. 4, 1964